United States Patent
Kim

(10) Patent No.: US 9,189,476 B2
(45) Date of Patent: Nov. 17, 2015

(54) TRANSLATION APPARATUS AND METHOD THEREOF FOR HELPING A USER TO MORE EASILY INPUT A SENTENCE TO BE TRANSLATED

(71) Applicant: ELECTRONICS AND TELECOMMUNICATIONS RESEARCH INSTITUTE, Daejeon (KR)

(72) Inventor: Ki Hyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 344 days.

(21) Appl. No.: 13/749,151

(22) Filed: Jan. 24, 2013

(65) Prior Publication Data

US 2013/0268259 A1   Oct. 10, 2013

(30) Foreign Application Priority Data

Apr. 4, 2012  (KR) .................. 10-2012-0035126
Jul. 18, 2012  (KR) .................. 10-2012-0078368

(51) Int. Cl.
  *G06F 17/28*  (2006.01)
  *G10L 15/22*  (2006.01)
  *G10L 13/08*  (2013.01)

(52) U.S. Cl.
  CPC .............. *G06F 17/289* (2013.01); *G10L 15/22* (2013.01); *G10L 13/08* (2013.01)

(58) Field of Classification Search
  CPC .................................................. G06F 17/289
  USPC ............................................................ 704/2
  See application file for complete search history.

(56) References Cited

U.S. PATENT DOCUMENTS 5,408,410 A  *  4/1995  Kaji ................................. 704/2
5,978,754 A  *  11/1999  Kumano ......................... 704/3
(Continued)

FOREIGN PATENT DOCUMENTS

JP   2009-519534      5/2008
KR   10-2008-0094068  10/2008
(Continued)

OTHER PUBLICATIONS

Korean Office Action mailed Aug. 10, 2015 in corresponding Korean Application No. 2015-053303275.

*Primary Examiner* — Susan McFadden
(74) *Attorney, Agent, or Firm* — Staas & Halsey LLP

(57) ABSTRACT

Translation apparatus and method thereof for helping a user to more easily input a sentence to be translated. The translation apparatus has a speech input unit that receives a speech of a first language from a user, a control unit that generates sentences to be translated of the first language from the speech of the first language input from the speech input unit, a communication unit that transmits the sentences to be translated of the first language to a translation server and receives the sentences to be translated of a second language from the translation server, a display unit that displays the translated sentences of the second language along with previously translated sentences, a memory that stores a translation history including the sentences to be translated of the first language and the translated sentences of the second language, and a user input unit that receives an operation input of the previously translated sentences from a user.

17 Claims, 17 Drawing Sheets

(56) References Cited

U.S. PATENT DOCUMENTS

| | | | |
|---|---|---|---|
| 6,789,057 B1 * | 9/2004 | Morimoto et al. | 704/2 |
| 7,130,800 B1 * | 10/2006 | Currey et al. | 704/273 |
| 7,283,949 B2 * | 10/2007 | Shieh | 704/4 |
| 7,295,964 B2 * | 11/2007 | Suzuki | 704/2 |
| 7,526,423 B2 * | 4/2009 | Suzuki | 704/2 |
| 7,801,721 B2 * | 9/2010 | Rosart et al. | 704/8 |
| 7,848,916 B2 * | 12/2010 | Shieh | 704/4 |
| 7,979,265 B2 * | 7/2011 | Suzuki et al. | 704/4 |
| 7,983,897 B2 * | 7/2011 | Chin et al. | 704/2 |
| 7,991,607 B2 * | 8/2011 | Zhang et al. | 704/2 |
| 8,145,472 B2 * | 3/2012 | Shore et al. | 704/2 |
| 8,412,509 B1 * | 4/2013 | Pearson et al. | 704/2 |
| 8,583,417 B2 * | 11/2013 | Sumita et al. | 704/3 |
| 9,058,322 B2 * | 6/2015 | Kwon et al. | 1/1 |
| 2007/0208813 A1 | 9/2007 | Blagsvedt et al. | |
| 2009/0076792 A1 | 3/2009 | Lawson-Tancred | |
| 2009/0228273 A1 | 9/2009 | Wang et al. | |
| 2011/0153309 A1 | 6/2011 | Kim et al. | |
| 2013/0293577 A1 * | 11/2013 | Perez et al. | 345/633 |

FOREIGN PATENT DOCUMENTS

| | | |
|---|---|---|
| KR | 10-2011-0038448 | 4/2011 |
| KR | 10-2011-0071205 | 6/2011 |

* cited by examiner

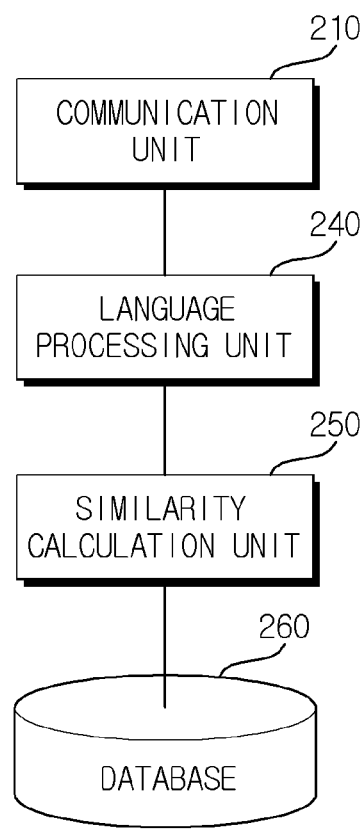

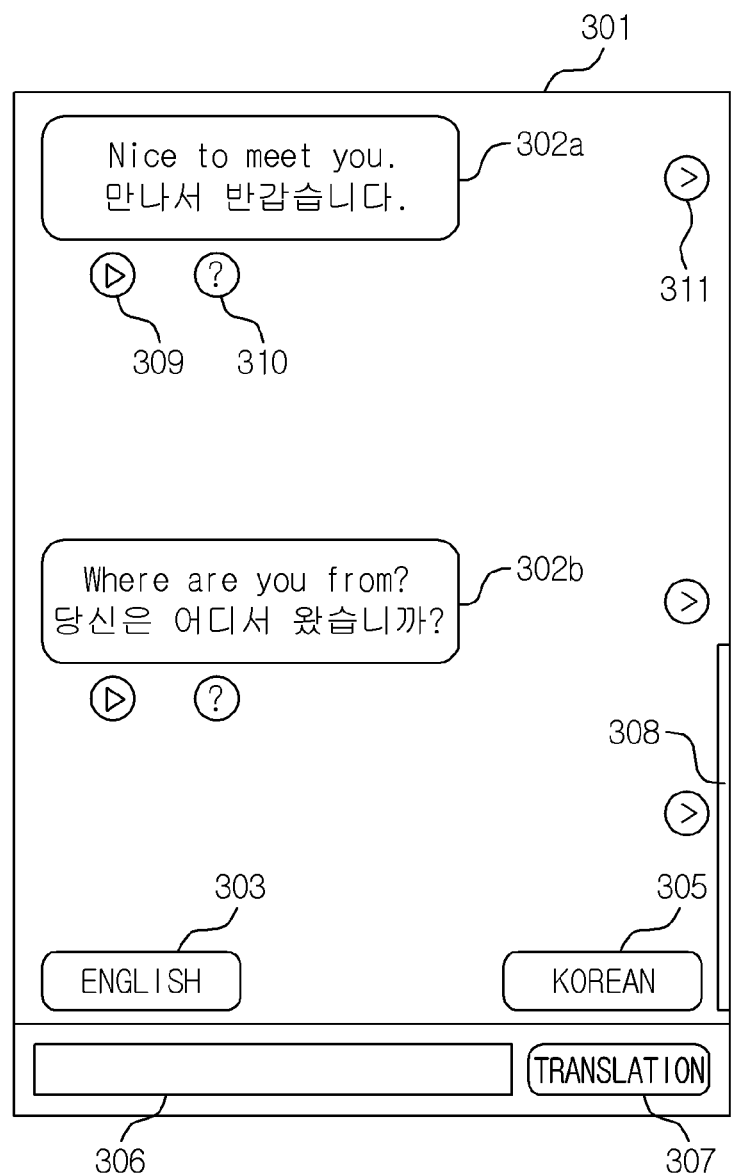

atus and
TRANSLATION APPARATUS AND METHOD THEREOF FOR HELPING A USER TO MORE EASILY INPUT A SENTENCE TO BE TRANSLATED

CROSS-REFERENCE TO RELATED APPLICATIONS

This application claims priority to and the benefit of Korean Patent Application No. 10-2012-0035126 filed in the Korean Intellectual Property Office on Apr. 4, 2012, and Korean Patent Application No. 10-2012-0078368 filed in the Korean Intellectual Property Office on Jul. 18, 2012 the entire contents of which are incorporated herein by reference.

TECHNICAL FIELD

The present invention relates to a translation apparatus and a method thereof, and more particularly, to an apparatus and a method for helping a user to more easily input a sentence to be translated. When the translation apparatus of the present invention displays the translated results on a screen as they are, a user can use the displayed results to input a sentence to be translated. A user can input a sentence to be translated through a speech or by typing or other input units and can use a previously translated sentence that is displayed on a screen to input the sentence to be translated. The present invention can minimize a speech recognition process involving many errors to increase translation efficiency. The present invention provides a method of enabling a user to conveniently input various commands for controlling a translation process.

BACKGROUND ART

A user interface of the existing translation apparatus performs speech recognition processing on a user's speech input through a mike to generate a sentence and display the generated sentence on a single window. When the sentence displayed on the window is translated, contents of the sentence are output on another window. The users are not familiar with the UI, such that there is a problem in that it takes much time and energy to adapt users thereto.

Even when a user frequently gives utterance several times due to the frequent occurrence of errors during a speech recognition process, it is difficult for the existing UI to approach the speech recognition and the translated results that have been attempted before.

Since the translation has been attempted only by the speech recognition merely using a microphone or only by a text input, a failure probability is high, such that a lot of attempts have been made so as to implement correct speech recognition and translation.

SUMMARY OF THE INVENTION

The present invention has been made in an effort to provide a translation apparatus that sequentially displays a sentence to be translated and a translated sentence on a screen in the generated order and uses the translated sentence displayed on the screen to input the sentence to be translated, and a method thereof.

However, objects of the present invention are not limited the above-mentioned matters and other objects can be clearly understood to those skilled in the art from the following descriptions.

An exemplary embodiment of the present invention a translation apparatus, including: a speech input unit that receives a speech of a first language from a user; a control unit that generates sentences to be translated of the first language from the speech of the first language input from the speech input unit; a communication unit that transmits the sentences to be translated of the first language to a translation server and receives the sentences to be translated of a second language from the translation server; a display unit that displays the translated sentences of the second language along with previously translated sentences; a memory that stores a translation history including the sentences to be translated of the first language and the translated sentences of the second language; and a user input unit that receives an operation input of the previously translated sentences from a user.

Another exemplary embodiment of the present invention a translation method, including: generating sentences to be translated of a first language according to an operation input of previously translated sentences displayed on a screen, when an automatic translation function is activated; transmitting the sentences to be translated of the first language to a translation server and receiving sentences to be translated of a second language from the translation server; and displaying the received translated sentences of the second language along with the already translated sentences.

As set forth above, according to the exemplary embodiments of the present invention, it is possible to provide the accurate translation results by sequentially displaying the sentence to be translated and the translated sentence on a screen in the generated order and using the translated sentence displayed on the screen to input the sentence to be translated and correcting the errors of the displayed sentence to be translated by the interaction with a user.

According to the exemplary embodiments of the present invention, it is possible to improve the convenience of a user by sequentially displaying the sentence to be translated and the translated sentence on a screen in the generated order and using the translated sentence displayed on the screen to input the sentence to be translated.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a diagram illustrating another example of a detailed configuration of the translation server 200 illustrated in FIG. 1.

FIG. 6 is a diagram illustrating a method for displaying a translation history according to the exemplary embodiment of the present invention.

Figure 1:
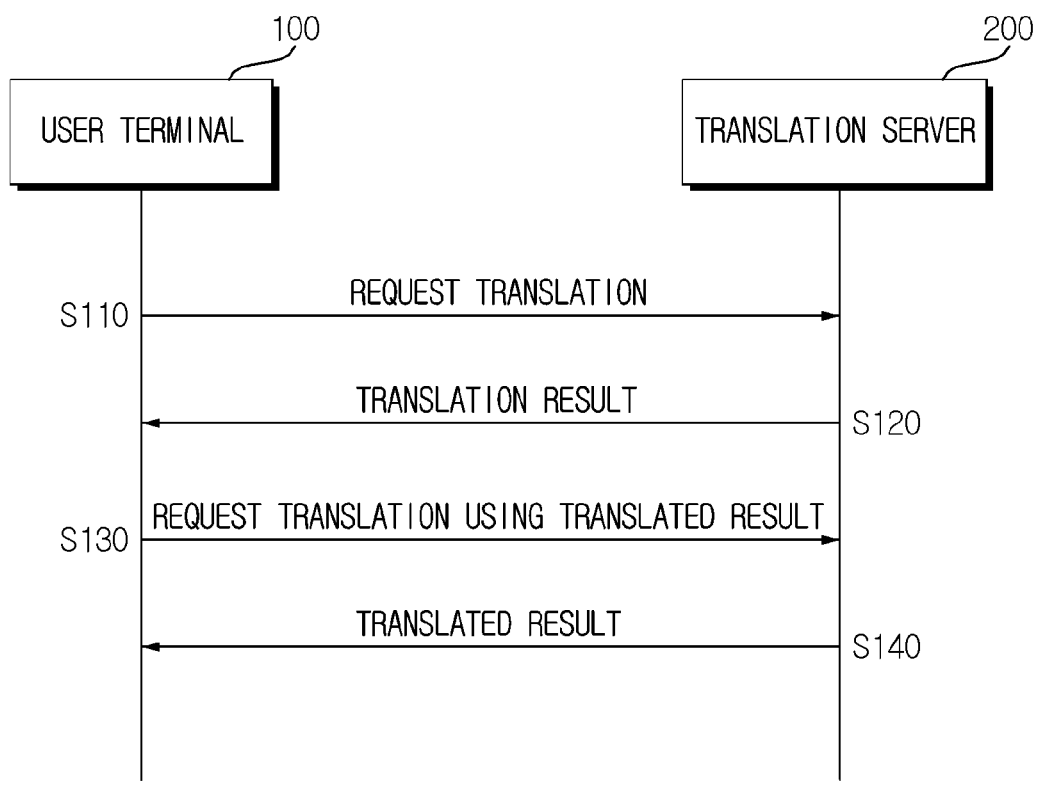
FIG. 1 is a diagram illustrating a network for providing a translation service according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a translation apparatus and a method thereof according to exemplary embodiments of the present invention will be described with reference to FIGS. 1 to 12.

FIG. 1 is a diagram illustrating a network for providing a translation service according to an exemplary embodiment of the present invention.

As illustrated in FIG. 1, a user terminal 100 may receive a sentence to be translated for automatic translation or translation through a speech from a user or by a keypad or other input units and transmit the input sentence to be translated to a translation server 200 to request translation. In this case, when the user terminal 100 receives the sentence to be translated through a speech from a user and recognizes the received speech to generate the sentence to be translated according to the recognized results.

When the translation server 200 receives the sentence to be translated from the user terminal 100, the translation server 200 may translate the received sentence to be translated and provide the translated sentence as the translated results to the user terminal 100.

When the user terminal 100 receives the translated results, the user terminal 100 displays the translated results, that is, the translated sentence on a screen as it is.

Next, the user terminal may use the translated results displayed on the screen to receive the sentence to be translated and transmit the input sentence to be translated to the translation server 200 to request translation.

When the translation server 200 receives the sentence to be translated from the user terminal 100, the translation server 200 may translate the received sentence to be translated and provide the translated sentence as the translated results to the user terminal 100.

In the exemplary embodiment of the present invention, a translation service may be provided by a form in which the user terminal 100 is connected with the translation server 200 by a network and a translation module is present in the user terminal 100 such that the user terminal 100 may perform a translation function.

Figure 2:
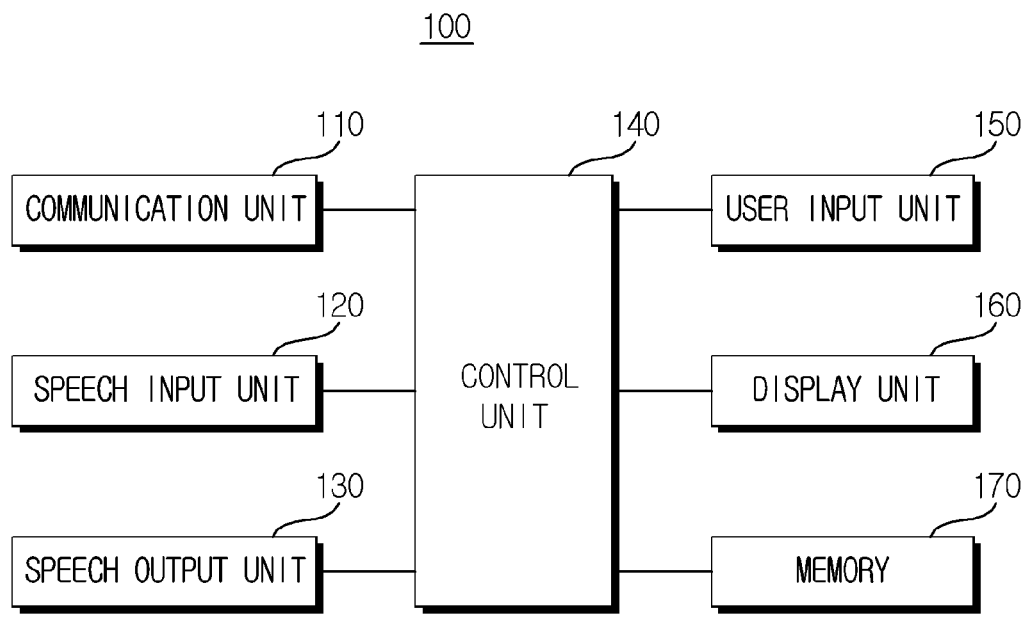
FIG. 2 is a diagram illustrating a configuration of a user terminal 100 for providing a translation service according to the exemplary embodiment of the present invention.

FIG. 2 is a diagram illustrating a configuration of a user terminal 100 for providing a translation service according to the exemplary embodiment of the present invention.

As illustrated in FIG. 2, the user terminal for providing a speech recognition user interface according to the exemplary embodiment of the present invention may be configured to include a communication unit 110, a speech input unit 120, a speech output unit 130, a control unit 140, a user input unit 150, a display unit 160, a memory 170, and the like. The mobile terminals are electronic devices that can perform wired or wireless communications and may be a concept including a mobile phone, a smart phone, personal digital assistants (PDAs), a tablet personal computer (PC), a notebook, and the like.

The communication unit 110 may interwork with the translation server by using a wired or wireless communication network and may transmit and receive various data for performing an automatic translation function, for example, a text to be translated, a translated sentence, and the like. The communication unit 110 may also transmit and receive mobile applications (mobile app.), and the like, for performing an automatic translation function.

In this case, the communication unit 110 may include at least one component that may perform wireless communication between the user terminal and the translation server or wireless communication between the mobile terminal and a network in which the mobile terminal is located. For example, the communication unit 110 may include a mobile communication module, a wireless Internet module, a short range communication module, and the like.

Herein, 1) the mobile communication module means a module that may transmit and receive a wireless signal to and from at least one of a base station, external terminals, and a server in a mobile communication network. 2) A wireless Internet module means a module for wireless Internet access, which may be installed internally or externally. 3) A short range communication module means a module for short range communication. As a short range communication technology, Bluetooth, radio frequency identification (RFID), infrared data association, ultra wideband (UWB), ZigBee, and the like, may be used.

When an automatic translation function is activated, the speech input unit 120 may receive a speech from a user for performing the automatic translation function. For example, as the speech input unit 120, a microphone, and the like, may be used.

The speech output unit 130 may output an audio signal, for example, may output the translated sentence as an audio signal when a user selects a text to speech (TTS) function.

The control unit 140 may recognize the speech input from a user and generate a sentence to be translated corresponding to the recognized speech. For example, the control unit 140 generates the sentence to be translated of a first language corresponding to the input speech of a first language and provides the generated sentence to the translation server. For this purpose, the control unit 140 may include an automatic speech recognition (ASR) engine. The user input unit 150 may directly receive a sentence to be translated and may receive various menu selections or key selections for performing the automatic translation function.

The display unit 160 may activate a translation display window and display a sentence to be translated that is generated by recognizing the speech input from a user and the translated sentence generated based on the sentence to be translated on the translation display window. The display unit 160 may display at least one button for correcting errors of the sentence to be translated by the interaction with a user. Here, the button may include at least one of figures, symbols, texts, and images that can identify a function for interaction with a user.

The icons may be installed on each side of the translation display window so as to enable a user to recognize that the icons are used for correcting errors of the sentence to be translated for each displayed sentence to be translated.

In this case, the display unit 160 may sequentially display the sentence to be translated and the translated sentence according to the generation time so that a user may confirm the translation history.

In this case, the display unit 160 may be divided into different two regions, for example, a left region and a right region to display a sentence translating the sentence to be translated of the first language into a second language on the left of the translation display window and display the sentence translating the sentence to be translated of the second language into a first language on the right of the translation display window. The display unit 160 may be a touch screen without a separate input unit. When the display unit 160 is not the touch screen, a separate input unit may be further provided.

For example, as the display unit 160, a liquid crystal display (LCD), a thin film transistor liquid crystal display (TFT LCD), an organic light emitting diode (OLED), a flexible display, a 3D display, and the like, may be used.

The memory 170 may store the sentence to be translated corresponding to the input speech, and the translated sentence and store a dictionary that may be used to translate a sentence, and the like.

Figure 3:
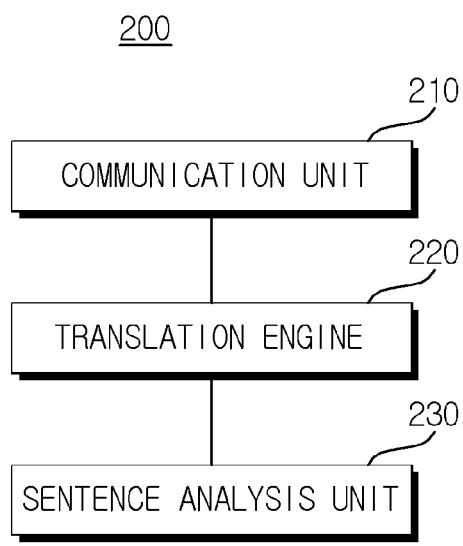
FIG. 3 is a diagram illustrating an example of a detailed configuration of a translation server 200 illustrated in FIG. 1.

FIG. 3 is a diagram illustrating an example of a detailed configuration of a translation server 200 illustrated in FIG. 1.

As illustrated in FIG. 3, the translation server 200 according to the exemplary embodiment of the present invention may be configured to include a communication unit 210, a translation engine 220, a sentence analysis unit 230, and the like.

The communication unit 210 may transmit and receive data to and from a user terminal in a wired or wireless type. For example, the communication unit 210 may receive the sentence to be translated from the user terminal. When the translation engine 220 receives the sentence to be translated from the user terminal, the translation engine 220 may generate the sentence to be translated corresponding to the input sentence to be translated and provide the generated sentence to be translated to the user terminal.

In this case, the sentence to be translated that is generated by the speech recognition results using the ASR engine 220 may include errors due to the surrounding noise or the lack of the speech recognition performance. In order to correctly correct the speech recognition results including errors, a user may request correction by the interaction with the mobile terminals without inputting speech again.

For example, a user touches the displayed sentence to be translated within the user terminal according to the speech recognition results and requests the correction of the touched sentence to be translated and the translated sentence to the sentence analysis unit 240.

When the sentence analysis unit 240 receives a request the correction, the sentence analysis unit 240 may generate at least one candidate sentence having a similar meaning to the touched sentence to be translated and may provide the generated candidate sentences to the user terminal.

FIG. 4 is a diagram illustrating another example of a detailed configuration of the translation server 200 illustrated in FIG. 1.

As illustrated in FIG. 4, the translation server 200 according to the exemplary embodiment of the present invention may be configured to include the communication unit 210, a language processing unit 240, a similarity calculation unit 250, a database 260, and the like. The communication unit 210 may transmit and receive data to and from the user terminal in a wired or wireless type. For example, the communication unit 210 may receive the sentence to be translated from the ARS engine within the user terminal.

The language processing unit 240 performs a language processing function that receives the sentence to be translated output from the ARS engine and extracts various elements necessary for similarity calculation from the input sentence to be translated. Here, in the case of Korean, various elements include a word, phrase, a morpheme/grammar, a sentence pattern, a tense, affirmation/negation, modality information, and a speech act representing a flow of a diagram. In this case, the language processing unit 240 extracts upper meaning information or class information on words such as person name, place name, amount, date, figure, and the like. The language processing unit may extract words similar to words extracted through an extension and an allomorph extension of similar words and words of an allomorph together. Here, similar words, for example, "stolen" mean other words having a similar meaning like, for example, "robbed" and the allomorph means words having different forms or the same meaning, like foreign languages, such as "시트/씨트" or "깨트리다/깨뜨리다".

The similarity calculation unit 250 may compare various elements extracted from the language processing unit 240 with various elements stored in the database 260 to calculate similarity indicating a similar degree therebetween. Here, a process of calculating the similarity may be performed by a similarity calculation algorithm that is an algorithm form of the following Equation 1.

$$Sim(S_1 S_2) = \sum_i w_i f_i(e_{1,i} e_{2,i}) \qquad \text{[Equation 1]}$$

Here, $S_1$ is an input sentence, $S_2$ is a candidate sentence, $f_i(e_1, i)$ is an i-th element of an input sentence, $f_i(e_2, i)$ is a similarity function for an i-th element for a candidate sentence, and wi represents a weight of $f_i$.

The similarity calculation results depending on the above Equation 1 may be represented by a probability form. In this case, the translation engine previously sets a threshold having a specific value and when the calculated similarity exceeds the threshold, performs the translation of the class information of the translated sentence with respect to the sentence to be translated that are selected from the database. On the other hand, when the calculated similarity is lower than the threshold, the translation engine requests the selection of a user or the translation for the sentence to be translated, for example, a machine translation.

Figure 5A:
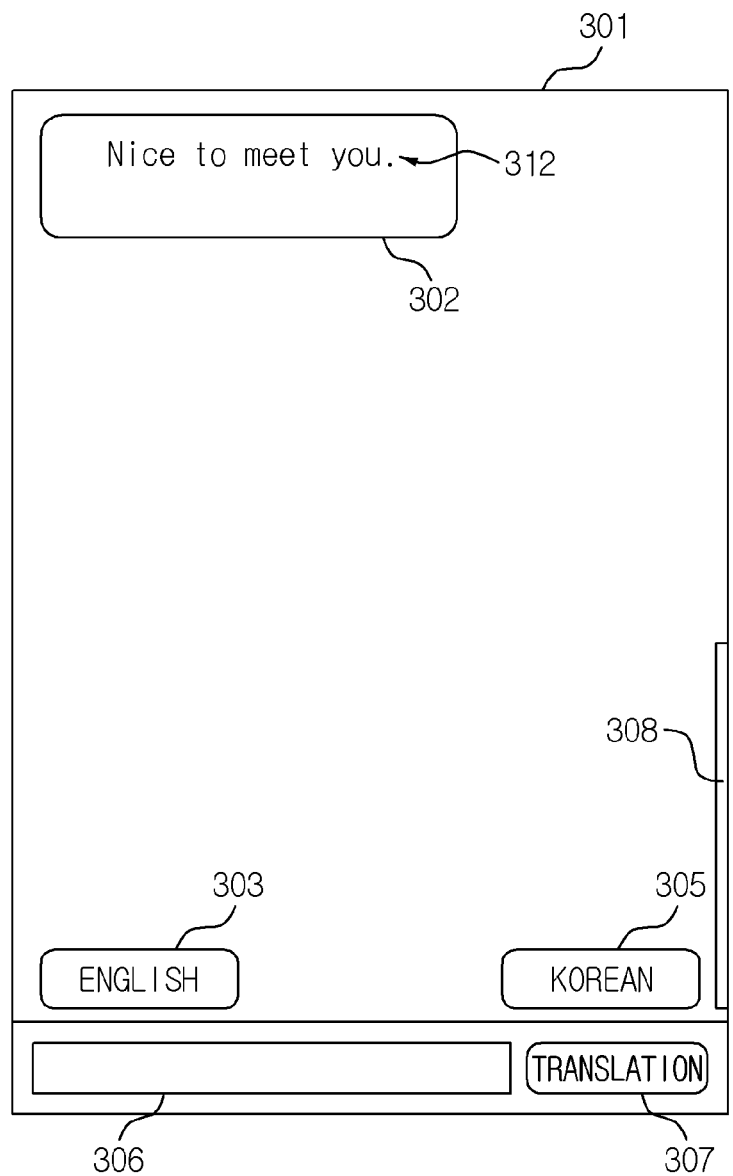
FIGS. 5A and 5B are diagrams illustrating a method for providing a translation function on a user terminal 10 according to the exemplary embodiment of the present invention.
Figure 5B:
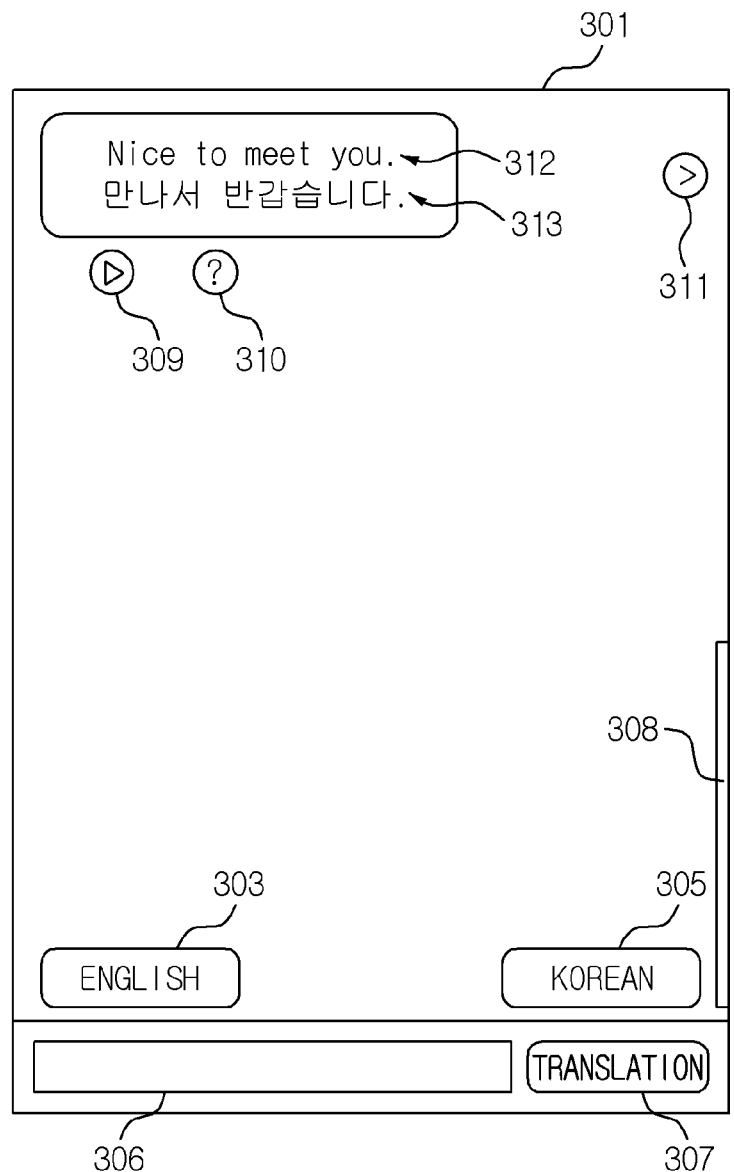

FIGS. 5A and 5B are diagrams illustrating a method for providing a translation function on a user terminal 10 according to the exemplary embodiment of the present invention.

Referring to FIG. 5A, when a user translates English into Korean, a user presses an 'English' button 303 located at a left bottom, inputs the sentence to be translated of the first language to a text input window 306, and presses a translation button 307, thereby performing translation. In this case, the sentence 312 to be translated that is input to the text input window 306 while the translation is performed is displayed on the translation window 302. The translation window 302 is displayed in a speech bubble form.

A 'Korean' button 305 may be used when translating Korean into English.

Referring to FIG. 5B, as results obtained by performing the translation, the sentence 312 to be translated of the first language and the translated sentence 313 of the second language may be displayed in parallel. One side of the translation window 302 on which the sentence 312 to be translated and the translated sentence 313 may be displayed together with at least one button for interaction with a user, for example, a TTS button 309, a declarative sentence-interrogative sentence conversion button 310, a similar sentence button 311, and the like.

For example, when a user presses the TTS button 309, the translated sentence may be heard as speech by the test to speech (TTS) function. Here, the TTS is referred to as a text to speech automatic conversion technology and represents a function that may immediately convert and output text into speech.

When a user presses the declarative sentence-interrogative sentence conversion button 310, the recognized sentence is converted into the declarative sentence or the interrogative sentence to provide the translated sentence corresponding to the recognized sentence of the converted declarative sentence or interrogative sentence. Languages such as Korean or Japanese unlike English little have the difference between the interrogative sentence and the declarative sentence. When the already recognized sentence or the translated sentence is a declarative sentence, the interrogative sentence may be generated by using the conversion button 310 and to the contrary, when the recognized sentence or the translated sentence is the interrogative sentence, the declarative sentence may be generated by using the conversion button 310.

When a user presses the similar sentence button 311, the user may receive at least one candidate recognition sentence or a candidate translation sentence having the meaning similar to the recognized sentence or the translated sentence.

The exemplary embodiment of the present invention describes the TTS button 309, the declarative sentence-interrogative sentence conversion button 310, and the similar sentence button 311 as an example of icons for interface with a user, but is not necessarily limited thereto and therefore, various buttons may be used.

The translation window is displayed on the screen 301 of the user terminal according to the generation time, such that a user may confirm the translation history using a scroll bar 308 later.

The user terminal continues to store the translation history until a user performs a reset by himself/herself, such that a user may confirm the translation history even though the automatic translation function is used after a predetermined time lapses.

The exemplary embodiment of the present invention uses a user interface similar to a chatting program or an SNS application that is used in the existing computer or a user interface similar to an SMS text message or a chatting program of a mobile device, such that a user may easily access applications and may easily adapt the function.

FIG. 6 is a diagram illustrating a method for displaying a translation history according to the exemplary embodiment of the present invention.

As illustrated in FIG. 6, translation windows 302a and 302b may be sequentially displayed on the screen 301 of the user terminal according to the generation time. For example, the translation window 302a is generated and displayed and the translation window 302b is generated and displayed.

In this case, a user may use the scroll bar 308 to confirm the translation history. That is, a user puts the scroll bar 308 on a top portion of the screen to confirm the previous translation history.

Figure 7A:
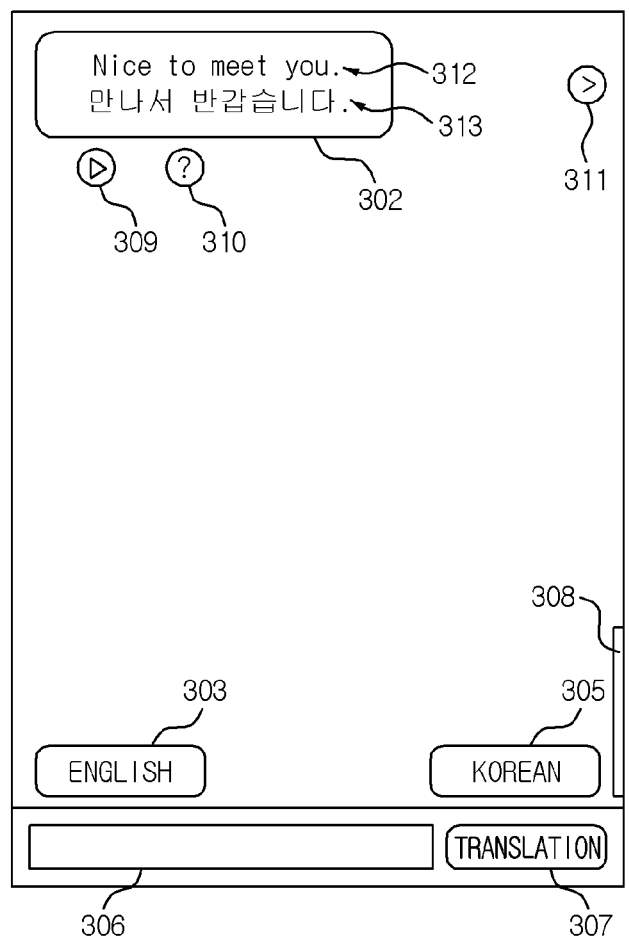
FIGS. 7A to 7C are diagrams illustrating a method for presenting a sentence similar to an already input sentence or a translated sentence according to the exemplary embodiment of the present invention.
Figure 7B:
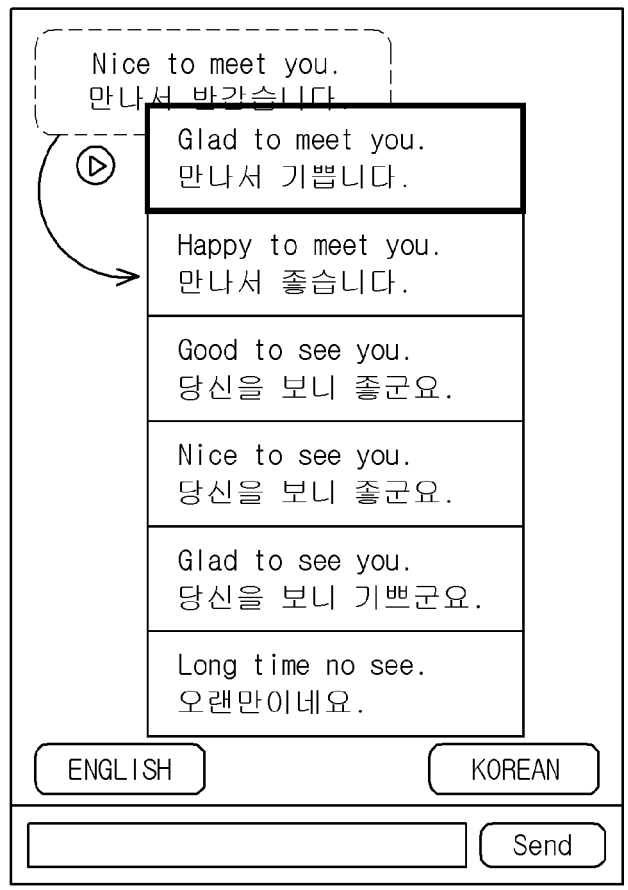
Figure 7C:
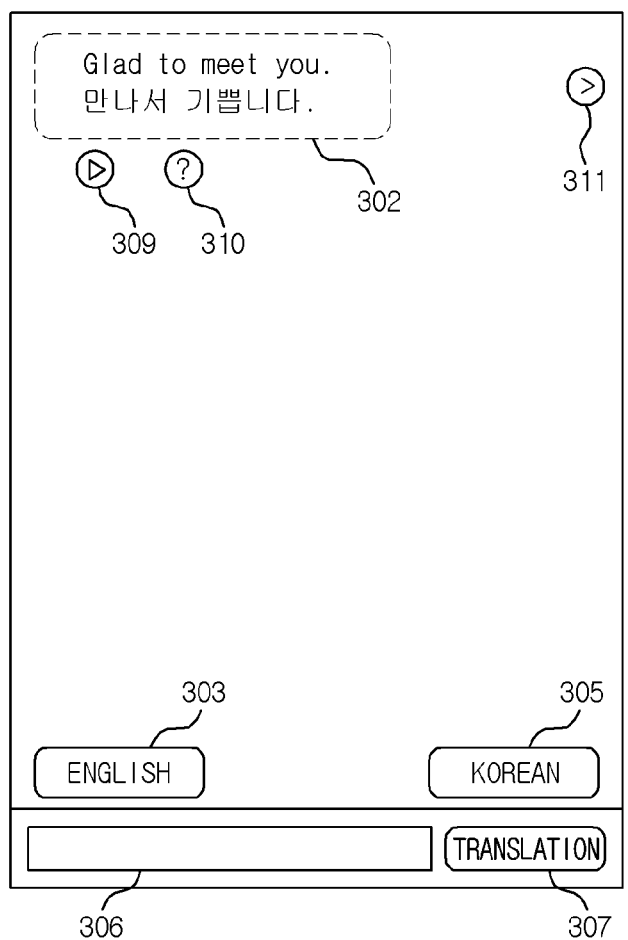

FIGS. 7A to 7C are diagrams illustrating a method for presenting sentences similar to already input sentences or translated sentences according to the exemplary embodiment of the present invention.

As illustrated in FIGS. 7A to 7C, when a user presses the similar sentence button 311, at least one candidate sentence 320 having a meaning similar to the sentence to be translated may be displayed on the screen of the user terminal. FIGS. 7A to 7C illustrate that candidate sentence lists including a plurality of candidate sentences having a meaning similar to the sentence 311 to be translated are provided.

For example, "Glad to meet you", Happy to meet you", "Good to see you", "Nice to see you", "Glad to see you", "Long time no see", and the like, that have a similar meaning to "Nice to meet you" are displayed.

When a user selects a candidate sentence of "Glad to meet you", the selected candidate sentence is displayed, instead of "Nice to meet you".

Figure 8A:
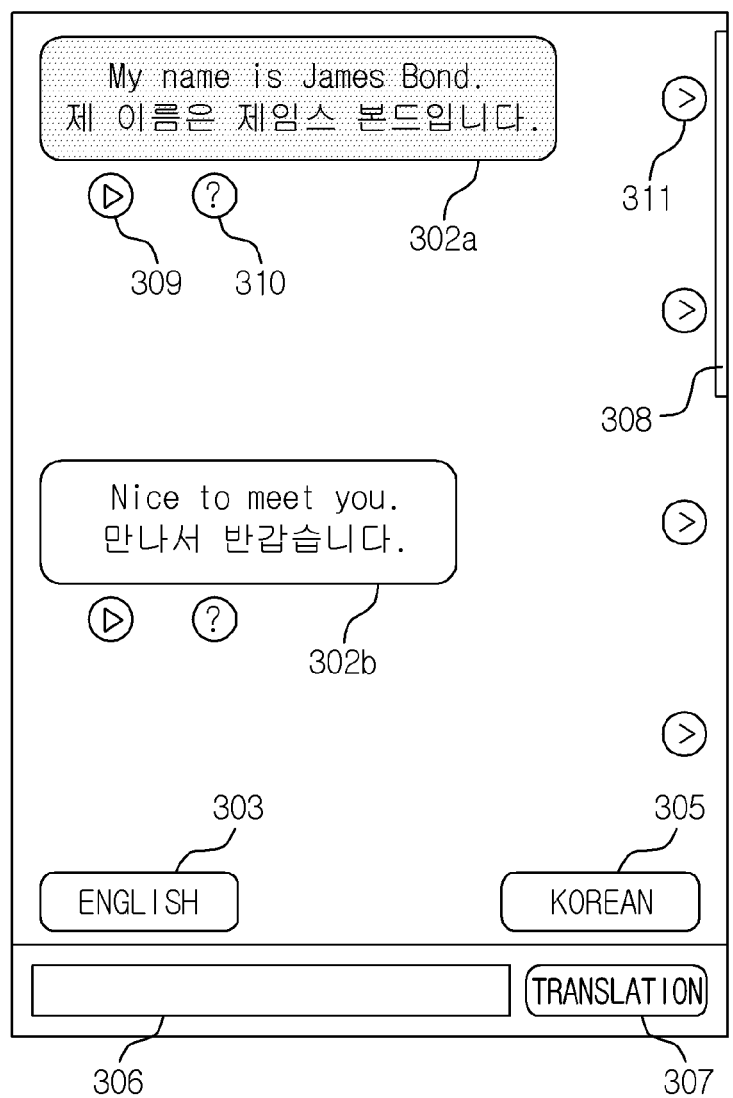
FIGS. 8A and 8B are diagrams illustrating a method for using a TTS function by using a translation history according to the exemplary embodiment of the present invention.
Figure 8B:
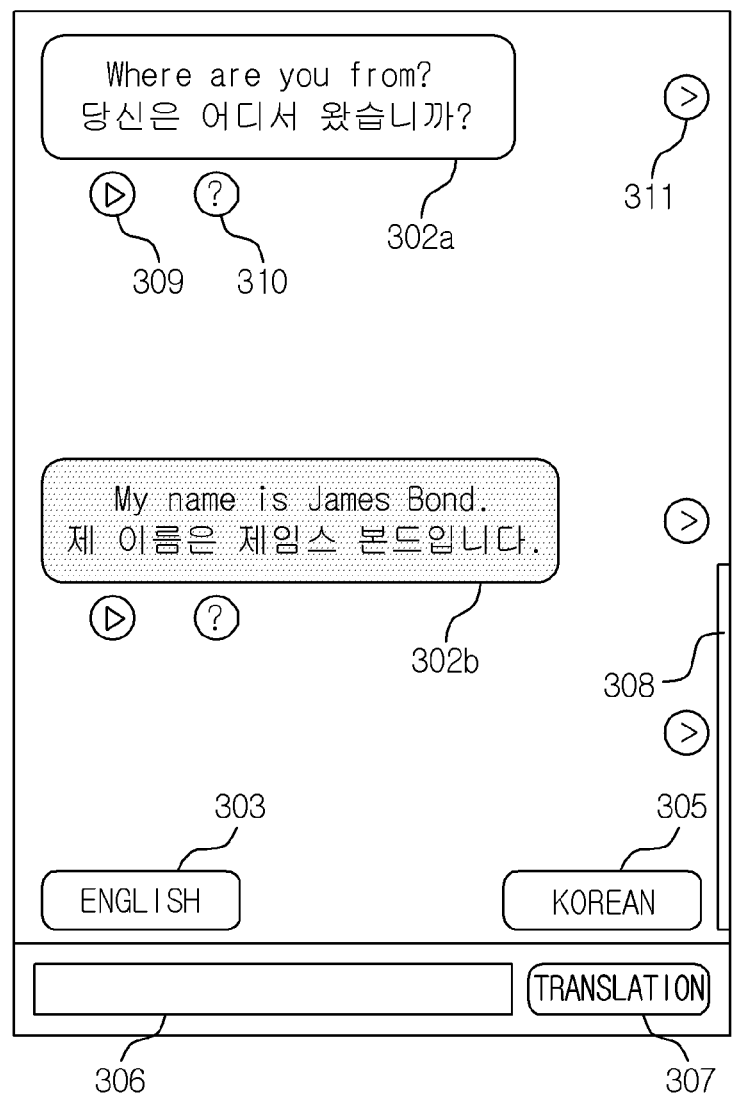

The candidate sentence 320 may be provided by the translation server 200 illustrated in FIG. 4. The candidate sentence 320 may also be generated from the database 260 of the translation server 200 and may also be extracted from the member 170 of the user terminal 100. FIGS. 8A and 8B are diagrams illustrating a method for using a TTS function by using a translation history according to the exemplary embodiment of the present invention.

As illustrated FIG. 8A, when a user uses the scroll bar to confirm the previous translation history and uses the TTS function for the sentence to be translated that is displayed on one translation window 302a among the previous translation histories, a user presses a play button 309.

In FIG. 8B, the user terminal performs the TTS function for the sentence to be translated and adds the translation window 302b to the last of the translation history according to the performed results.

Figure 9A:
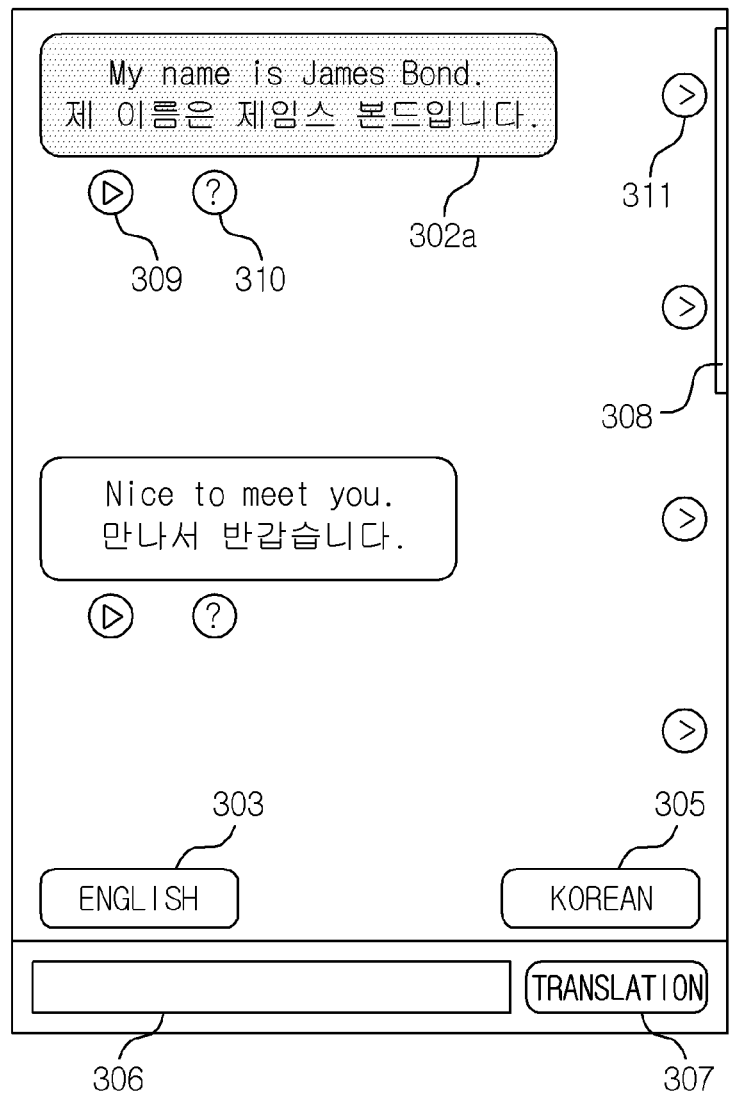
FIGS. 9A and 9B are diagrams illustrating a method for converting a translated sentence into a declarative sentence/interrogative sentence according to the exemplary embodiment of the present invention.
Figure 9B:
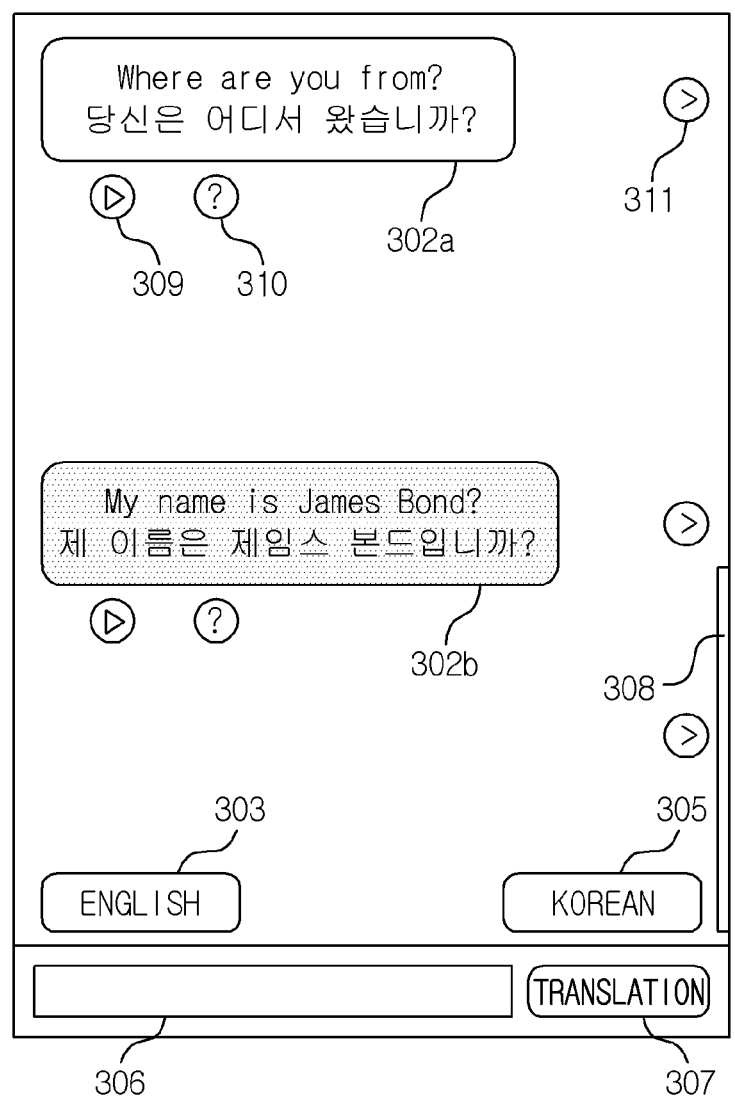

FIGS. 9A and 9B are diagrams illustrating a method for converting translated sentences into a declarative sentence/interrogative sentence according to the exemplary embodiment of the present invention.

FIGS. 9A and 9B illustrate that when a user presses the declarative sentence-interrogative sentence conversion button 310, the recognition sentence is converted into the declarative sentence or the interrogative sentence to provide the recognition sentence of the converted declarative sentence or interrogative sentence and the translation sentence corresponding to the recognition sentence on the screen of the mobile terminal.

For example, a declarative sentence such as "My name is James Bond" is converted into an interrogative sentence such as "My name is James Bond?" and is then displayed.

Therefore, when a sentence such as "My name is James Bond" is present in the translation history, a user may input the interrogative sentence of the sentence, that is, "My name is James Bond" without utterance.

Figure 10:
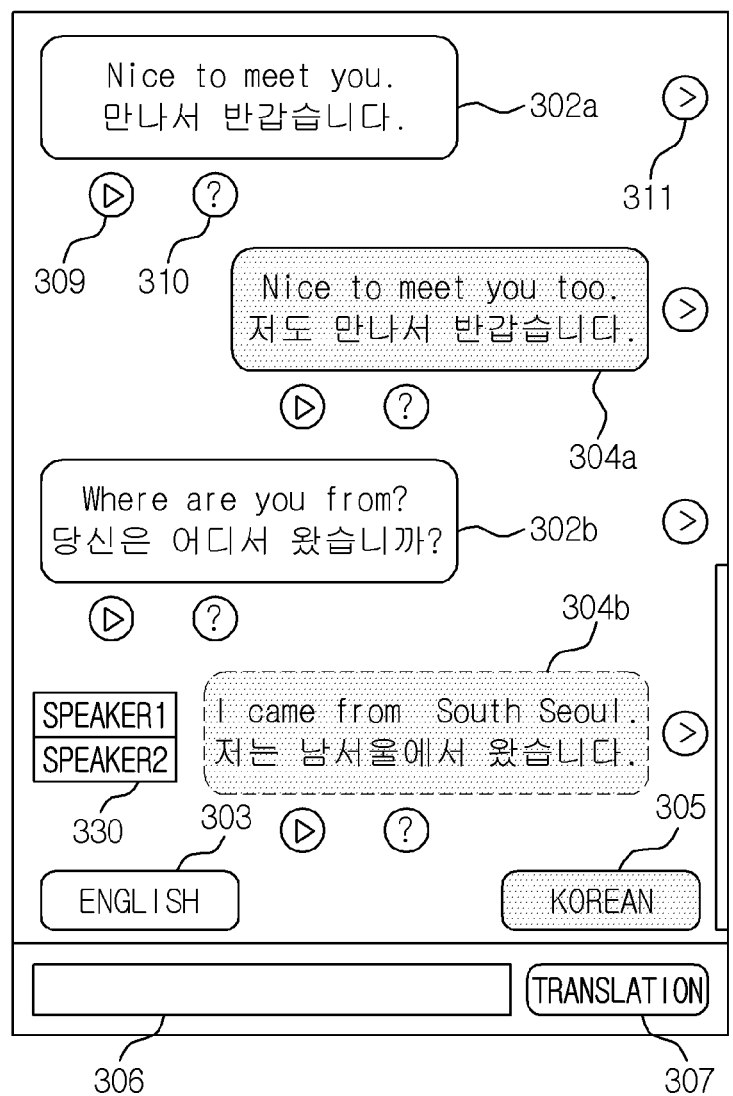
FIG. 10 is a diagram illustrating a method for displaying a translation history as an interactive type according to the exemplary embodiment of the present invention.

FIG. 10 is a diagram illustrating a method for displaying a translation history as an interactive type according to the exemplary embodiment of the present invention.

As illustrated in FIG. 10, a user may select an "interactive mode" and when the "interactive mode" is selected, the translation history may be displayed in an interactive type according to a speaker. That is, contents input by a first speaker (speaker1) are displayed on one side of the screen of the user terminal 10 and contents input by a second speaker (speaker2) are displayed on the other thereof. The input subject may be selected using a speaker selection button 330. The input contents for each speaker may be displayed by a color.

Figure 11A:
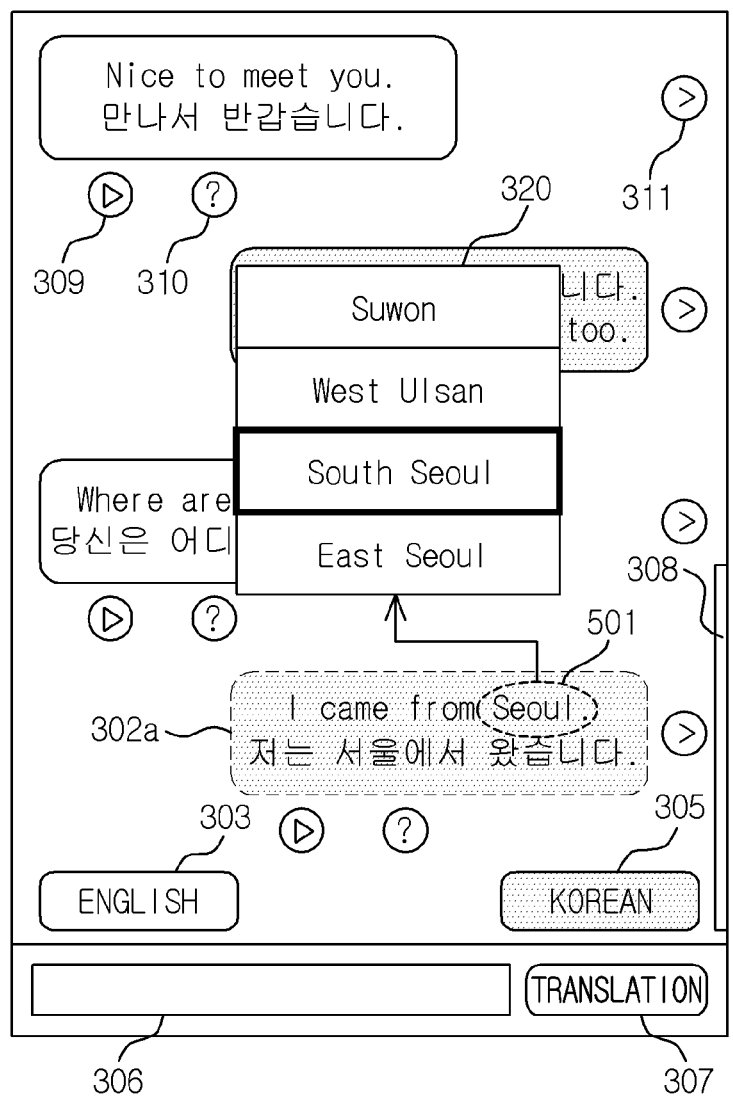
FIGS. 11A and 11B are diagrams illustrating an example of correcting and using a part of a sentence included in a translation history according to the exemplary embodiment of the present invention.
Figure 11B:
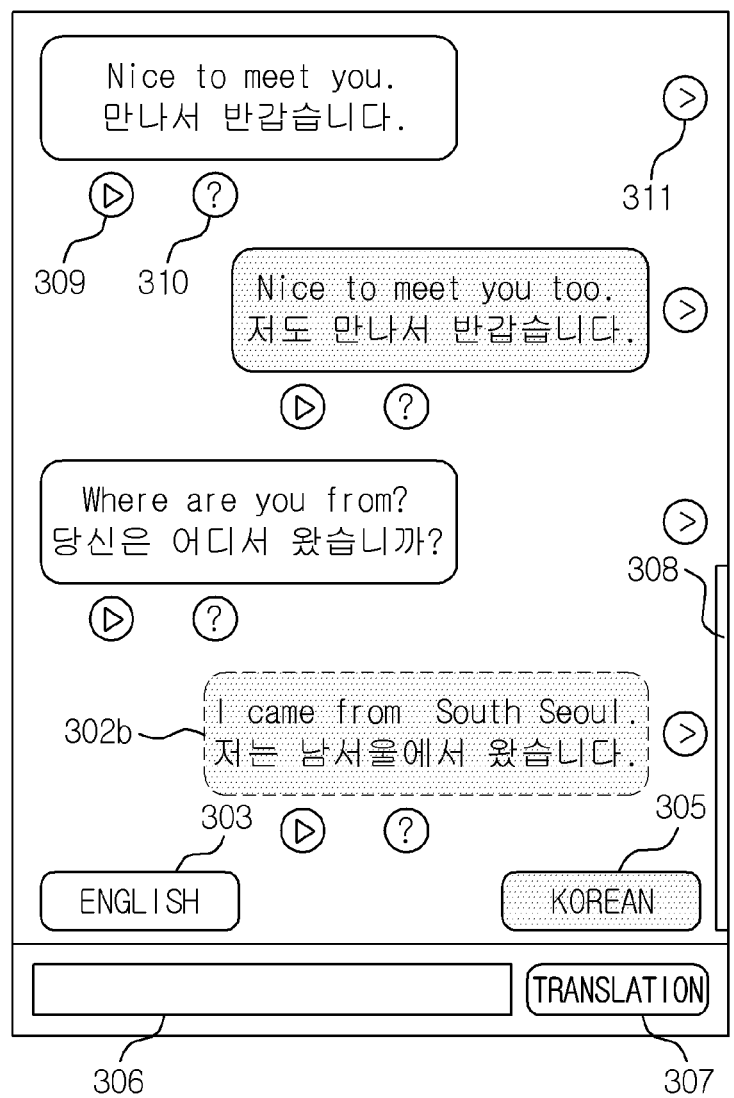

FIGS. 11A and 11B are diagrams illustrating an example of correcting and using a part of sentences included in a translation history according to the exemplary embodiment of the present invention.

As illustrated in FIGS. 11A and 11B, when a user selects a word or a part of the sentence to be corrected by a method such as block designation, and the like, in the displayed sentence to be translated, a candidate word 320 or a phrase similar to the selected word is displayed on the screen of the user terminal. The exemplary embodiment of the present invention may enable a user to select a word within the sentence to be translated and may select a word within the sentence to be translated corresponding to the sentence to be translated. In this case, the similar candidate word may be a word having a similar meaning or a word having a similar pronunciation.

For example, when "Seoul" in a sentence of "I came from Seoul" is touched, "Suwon", "West Ulsan", "South Seoul", and "East Seoul" that are similar to "Seoul" are displayed.

When a user selects a candidate word of "South Seoul", candidate words of the "South Seoul" are displayed, instead of "Seoul". That is, the sentence to be translated and the translated sentence are both corrected and displayed and are corrected to "I came from South Seoul".

Figure 12:
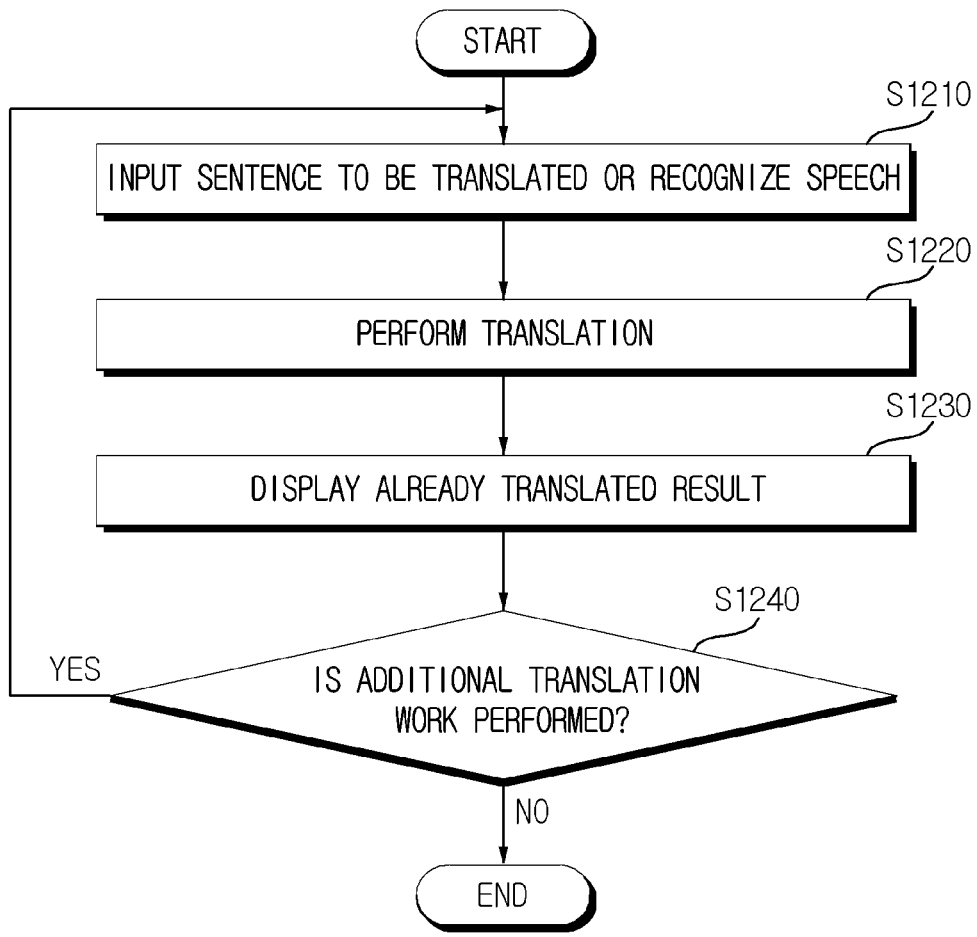
FIG. 12 is a diagram illustrating a method for providing a translation service according to the exemplary embodiment of the present invention.

FIG. 12 is a diagram illustrating a method for providing a translation service according to the exemplary embodiment of the present invention.

As illustrated in FIG. 12, the user terminal according to the exemplary embodiment of the present invention may receive the speech of the first language from a user according to the selection of a user of the automatic translation function or receive the sentence to be translated of the first language (S1210).

In this case, when the user terminal receives the speech of the first language, the user terminal recognizes the input speech of the first language to generate the sentence to be translated of the first language as the speech recognizing results.

Alternatively, the user terminal may use the previous translation result to receive the sentence to be translated. That is, the user terminal may receive as the sentence to be translated a part or all of the sentences selected by a user among the sentences displayed as the previous translation results.

Next, the user terminal may perform the translation on the input sentence to be translated of the first language and generate the translated sentence of the second language as the performed results (S1220).

Next, the user terminal may display the generated sentence to be translated of the first language and the translated sentence of the second language (S1230).

Next, the user terminal may confirm whether the additional translation work is requested from a user (S1240). That is, when the user terminal receives a request of the additional translation work according to the confirmed result, the user terminal starts from the process of receiving the sentence to be translated again.

Meanwhile, it is described that all components configuring the embodiments of the present invention described above are integrally coupled or operated by being coupled, but the present invention is not necessarily limited to the foregoing embodiments. That is, all the components may be operated by being selectively coupled in at least one within the scope of the present invention. All the components may be implemented by one independent hardware and may be implemented by computer programs having a program module performing a part or all the functions combined in one or a plurality of hardwares by selectively combining a part or all of components. In addition the computer programs are stored in computer readable media such as a USB memory, a CD disk, a flash memory, and the like, and are read and run by the computer and thus, the embodiments of the present invention can be implemented. An example of the storage media for the computer programs may include a magnetic recording medium, an optical recording medium, a carrier wave medium, and the like.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A translation apparatus, comprising:
a speech input unit that receives a speech of a first language from a user;
a control unit that generates sentences of the first language from the speech of the first language input from the speech input unit;
a communication unit that transmits the sentences of the first language to a translation server and receives sentences of a second language from the translation server;
a display unit that displays the sentences of the second language along with previously translated sentences;
a memory that stores a translation history including the sentences of the first language and the sentences of the second language; and
a user input unit that receives an operation input of the previously translated sentences from a user,
wherein the sentences of the second language are translated sentences corresponding to the sentences of the first language,
wherein the control unit is configured to confirm whether the same words as words included in the sentences of the first language are present within the translation history according to an input of the user and if determined that the same words are present, perform a controls to display the same words.

2. The translation apparatus of claim 1, further comprising:
a speech output unit that converts the sentences of the second language into a speech and outputs the sentences of the second language as a speech.

3. The translation apparatus of claim 1, wherein the display unit sequentially displays the sentences of the first language and the sentences of the second language generated into one pair in the generated order.

4. The translation apparatus of claim 1, wherein the display unit displays at least one button that corrects errors of the displayed sentences of the first language by interaction with the user.

5. The translation apparatus of claim 4, wherein the control unit performs a control to display candidate sentence lists for correcting the errors of the sentences of the first language according to the operation of the at least one button.

6. The translation apparatus of claim 5, wherein the control unit corrects the errors of the sentences of the first language by using a candidate sentence selected from the displayed candidate sentence lists.

7. The translation apparatus of claim 4, wherein the at least one button includes at least one of figures, symbols, texts, and images for identifying an interaction with the user.

8. The translation apparatus of claim 1, wherein the generated sentences of the first language are displayed in a speech bubble form as a result of recognizing the speech of the first language input from the user.

9. The translation apparatus of claim 1, wherein when the first language is translated into the second language according to a request of a first speaker, the sentences of the first language and the sentences of the second language are displayed on one side of a screen, and when the second language is translated into the first language according to a request of a second speaker, the sentences of the second language and sentences translated into the first language are displayed on another side of the screen.

10. A translation apparatus, comprising:
a speech input unit that receives a speech of a first language from a user;
a control unit that generates sentences of the first language from the speech of the first language input from the speech input unit;
a communication unit that transmits the sentences of the first language to a translation server and receives sentences of a second language from the translation server;
a display unit that displays the sentences of the second language along with previously translated sentences;
a memory that stores a translation history including the sentences of the first language and the sentences of the second language;
a user input unit that receives an operation input of the previously translated sentences from a user;
a translation engine that generates the sentences of the second language; and
a sentence analysis unit that generates at least one candidate sentence having a meaning similar to the sentences of the first language according to a correction request of the sentences of the first language from the user, wherein the sentences of the second language are translated sentences corresponding to the sentences of the first language.

11. The translation apparatus of claim 10, further comprising:
a similarity calculation unit that calculates a similarity between the sentences of the first language and the previously translated sentences,
wherein the translation engine generates the sentences of the second language based on the similarity calculated by the similarity calculation unit.

12. A translation method, comprising:
generating sentences of a first language according to an operation input of previously translated sentences displayed on a screen, when an automatic translation function is activated;
transmitting the sentences of the first language to a translation server and receiving sentences of a second language from the translation server; and
displaying the received sentences of the second language along with the previously translated sentences,
wherein in the displaying, at least one button for correcting errors of the displayed sentences of the first language by interaction with the user is displayed,
wherein the sentences of the second language are translated sentences corresponding to the sentences of the first language.

13. The translation apparatus of claim 12, wherein in the generating, the sentences of the first language are generated by performing an operation to select or correct all or a part of the previously translated sentences displayed.

14. The translation method of claim 12, wherein in the displaying, when the first language is translated into the second language according to a request of a first speaker, the sentences of the first language and sentences of the second language are displayed on one side of a screen, and when the second language is translated into the first language according to a request of a second speaker, the sentences of the second language and sentences translated into the first language are displayed on another side of the screen.

15. The translation method of claim 12, wherein in the displaying,
the sentences of the first language and the sentences of the second language generated into one pair are sequentially displayed in chronological order.

16. The translation apparatus of claim 12, wherein in the displaying, candidate sentence lists for correcting the errors of the displayed sentences of the first language according to an operation of the at least one button are displayed.

17. The translation method of claim 12, wherein in the displaying, the generated sentences of the first language are displayed in a bubble form as a result of recognizing a speech of the first language input by the user.

* * * * *